(12) United States Patent
Snead

(10) Patent No.: US 9,468,790 B1
(45) Date of Patent: Oct. 18, 2016

(54) OVAL EXERCISE HOOP

(71) Applicant: Robert T. Snead, Montrose, CO (US)

(72) Inventor: Robert T. Snead, Montrose, CO (US)

( * ) Notice: Subject to any disclaimer, the term of this patent is extended or adjusted under 35 U.S.C. 154(b) by 194 days.

(21) Appl. No.: 14/286,728

(22) Filed: May 23, 2014

(51) Int. Cl.
*A63B 21/00* (2006.01)
*A63B 21/06* (2006.01)
*A63B 19/02* (2006.01)

(52) U.S. Cl.
CPC ........... *A63B 21/0608* (2013.01); *A63B 19/02* (2013.01); *A63B 21/0604* (2013.01)

(58) Field of Classification Search
CPC ...................................... A63B 21/00
USPC ............................. 482/91, 148, 35
See application file for complete search history.

(56) References Cited

U.S. PATENT DOCUMENTS

| 5,338,244 | A | * | 8/1994 | Huang | ................... | A63B 19/00 446/236 |
| 5,342,273 | A | | 8/1994 | Plendl et al. | | |
| 5,569,134 | A | * | 10/1996 | Nordanger | ............. | A63B 19/00 446/236 |
| 5,823,846 | A | | 10/1998 | Arriola et al. | | |
| 6,431,939 | B1 | | 8/2002 | Roh et al. | | |
| 6,599,222 | B2 | | 7/2003 | Wince | | |
| 6,712,779 | B1 | | 3/2004 | Iverson | | |
| 2010/0029446 | A1 | * | 2/2010 | Munoz | ................... | A63B 15/00 482/78 |
| 2011/0151748 | A1 | * | 6/2011 | Warren | ................... | A63B 19/00 446/485 |
| 2013/0225037 | A1 | * | 8/2013 | Deluz | .................... | A63H 33/26 446/242 |
| 2015/0273260 | A1 | * | 10/2015 | Hotchkis | ................ | A63B 19/00 482/23 |

* cited by examiner

*Primary Examiner* — Jerome W Donnelly
(74) *Attorney, Agent, or Firm* — Crossley & Stevenson Intellectual Property Law

(57) ABSTRACT

An oval exercise hoop for resistance training including an oval two-sectioned tubular sleeve, with the sections attachable to each other by a pair of diametrically opposed male end connectors engage the female ends of each section. The male end connectors are disposed proximal to, but not directly on, diametrically opposed apices of the sleeve. A hollow core, which is disposed within each sleeve section, is either unweighted or weighted with a weighted fill having a wide range of densities and materials that provide a selected weight from a wide range of aggregate weights so as to require a selected amount of energy to rotate the sleeve around a user's waist and torso.

15 Claims, 9 Drawing Sheets

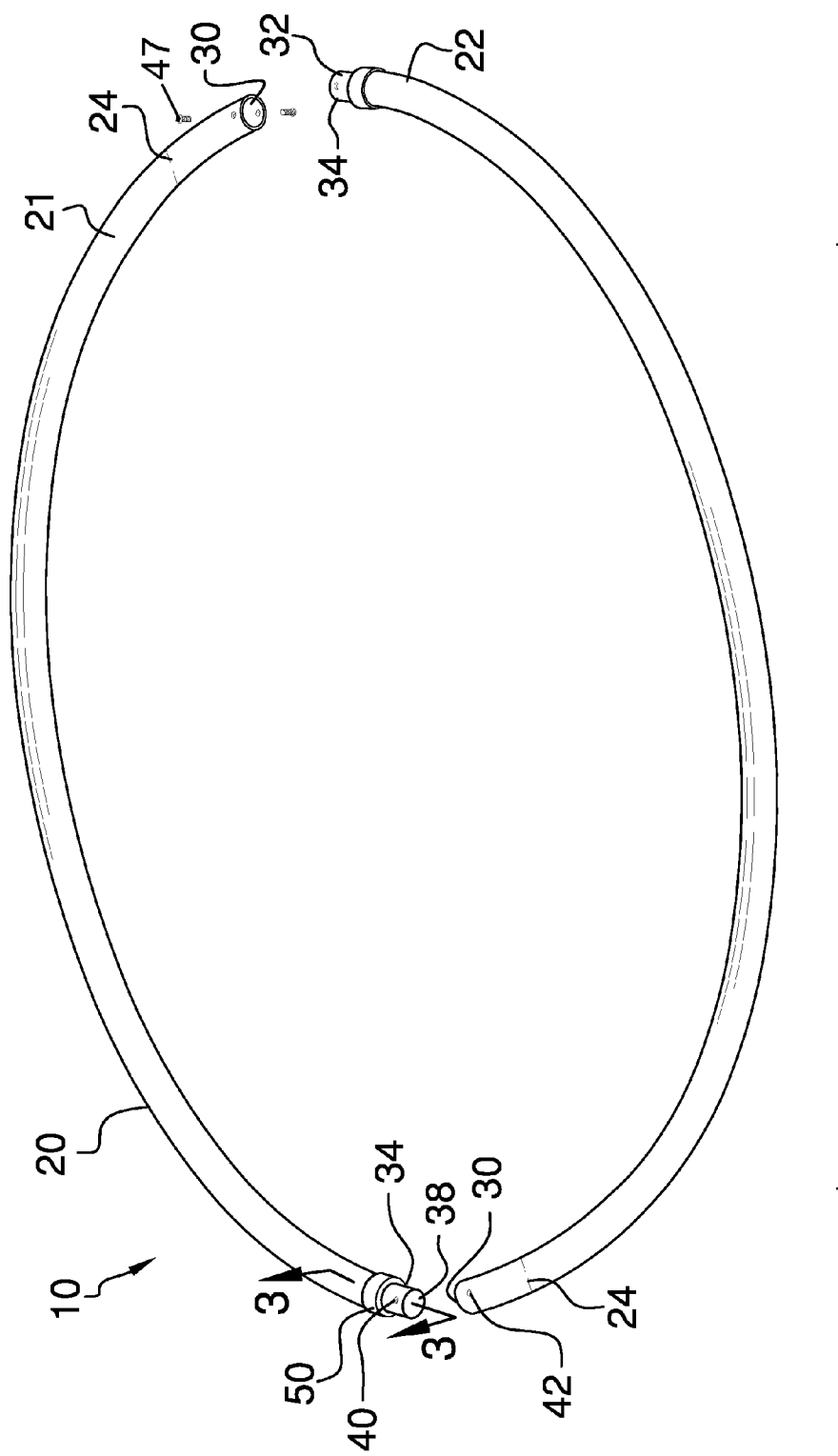

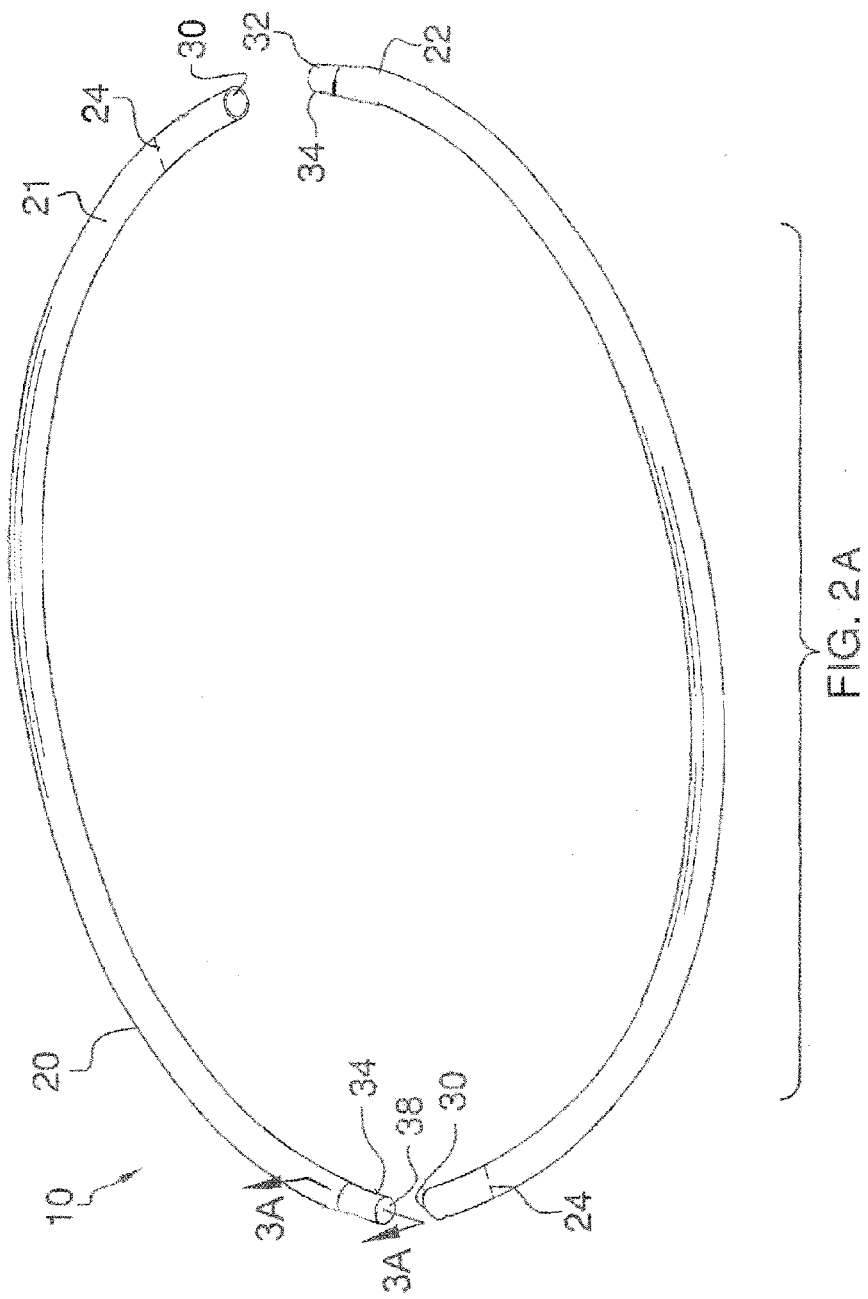

OVAL EXERCISE HOOP

BACKGROUND OF THE INVENTION

Various types of exercise hoops are known in the prior art. However, what is needed is an oval exercise hoop for resistance training including an oval two-sectioned tubular sleeve, with the sections attached to each other by a pair of diametrically opposed male end connectors engaging the female ends of each section. The male end connectors are disposed proximal to, but not directly on, diametrically opposed apices of the sleeve. A hollow core, which is disposed within each sleeve section, is either unweighted or weighted, to permit a user to obtain a desired level of energy expenditure during exercise using the present device.

FIELD OF THE INVENTION

The present invention relates to resistance weight exercise devices, and more particularly, to an oval exercise hoop which includes an oval tubular sleeve having a pair of attachable sections, each section having a hollow core which is either unfilled or filled with a weighted fill for a desired level of energy expenditure during exercise using the present device.

SUMMARY OF THE INVENTION

The general purpose of the present oval exercise hoop, described subsequently in greater detail, is to provide an oval exercise hoop which has many novel features that result in an oval exercise hoop which is not anticipated, rendered obvious, suggested, or even implied by prior art, either alone or in combination thereof.

To accomplish this, the present oval exercise hoop includes an oval tubular sleeve having first and second sections attachable to each other. The sleeve also has a pair of diametrically disposed apices. A male end connector of the first section and a male end connector of the second section are attached to an open female end of the second section and the first section, respectively, at an offset position relative the respective apex. A hollow core, which is continuously disposed within each section of the sleeve, is either unweighted or weighted, to permit a user to obtain a desired level of energy expenditure during exercise using the present device.

Each of the first and second sections has an open female end and a male end connector on an opposite end. The male end connector of the first section and the male end connector of the second section engage the female end of the second section and the first section, respectively, at an offset position relative the respective apex. The male end connectors are disposed approximately 70 degrees off a y-axis of the sleeve proximal the respective apex. Each male end connector includes a cylindrical interconnect extension having a connection end and an outer end opposite the connection end. The location of the male end connectors is off the y-axis because if the male end connectors were located directly on the y-axis or on the x-axis, the grip on what is only the minimum and maximum distances would otherwise be compromised. The outer end of each of the interconnect extensions is either removably or permanently disposed within the respective female end of one of the first and second sections. A cushioned outer layer is continuously disposed on each of the first and second sections to provide a nonslip cushioned grip of the sleeve. The cushioned outer layer is formed of one of a foam cushion, a rubber material, and a rubber coated foam cushion or other material that functions consistently with the purposes of the present device. The outer layer of each section has an outside end.

Each removable interconnect extension outer end includes a first hole centrally disposed through the interconnect extension proximal the outer end. A second hole is centrally disposed proximal the female end. The first and second holes align upon disposition of the interconnect extension within the female end. In addition, a threaded insert is continuously disposed through the interconnect extension. A threaded fastener engages the threaded insert to secure the male end connector to the female end. Each removable interconnect extension outer end also optionally includes a ring permanently secured around the outside end of each outer layer of the respective sections upon disposition of the interconnect extension within the female end of each of the first and second sections thereby capturing the outside end of the outer layer. The interconnect extension securingly engages the ring. The interconnect extension has a centrally disposed protrusion thereon that engages a notch internally disposed in the ring to secure the ring to the sleeve. However, if both the interconnect extension outer ends of the first and second sections and the outside ends of each of the first and second outer layers are permanently conjoined together, such as by an adhesive, the first and second holes, the threaded insert and the threaded fastener are not present, while the rings are optionally provided.

The core of each of the first and second sections is either empty or contains a weighted fill continuously disposed within and encapsulated within the core of the first and second sections. The weighted fill has a selected density that has a direct positive correlation to an amount of energy required to rotate the sleeve around the user's waist and torso while exercising. The weight of the sleeve increases as the density of the weighted fill increases. The weight of the sleeve is up to 75 pounds. Upon assembly of the two sections to form the sleeve, the user holds the sleeve away from the body while rotating the sleeve from side to side around the waist and torso and at various other positions from the user's body. The rotation of the sleeve stretches and strengthens muscles in the user's arms and torso, while also expending energy. The present device also strengthens the legs and buttocks while stabilizing the body during the rotation of the waist and torso. Further, the instant oval exercise hoop not only functions to develop muscle but also improves balance and coordination. As the velocity of the side-to-side rotation of the sleeve is increased, the energy expended by the user also increases. The continuous variable dimensions of the oval shape of the hoop, in contrast to a round shaped hoop, afford multiple positions for users of different statures performing various exercises with a single device. In other words, a user can determine the distance between the sides of the oval shape hoop at which he positions his arms and grasps the hoop as desired for comfort, for a maximum or minimal stretch, or as appropriate for a particular exercise. A round shape hoop offers only a single distance between sides by which a user, who is standing in the center opening of the hoop, can position his arms and grasp the hoop.

Thus has been broadly outlined the more important features of the present oval exercise hoop so that the detailed description thereof that follows may be better understood and in order that the present contribution to the art may be better appreciated.

BRIEF DESCRIPTION OF THE DRAWINGS

Figures

FIG. 2 is an isometric view showing each of the female end connector and the male end connector separated from each other and including the first and second holes, the ring, and a threaded fastener.

FIG. 2A is an isometric view showing each of the female end connector and the male end connector separated from each other, but without the first and second holes, the ring, and the threaded fastener.

DETAILED DESCRIPTION OF THE DRAWINGS

Figure 1:
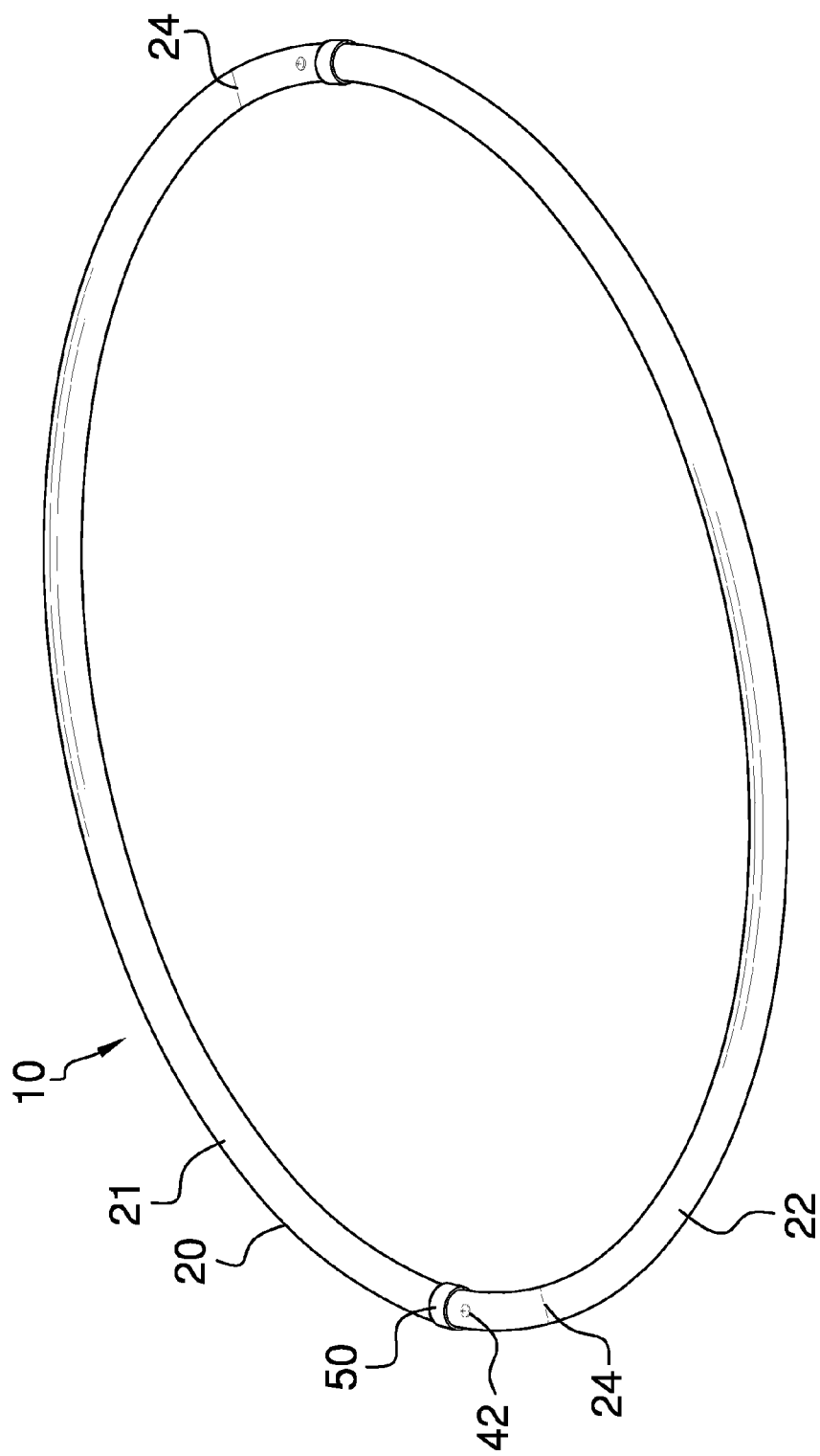
FIG. 1 is an isometric view showing each of a female end connector and a male end connector separably attached together with a first hole and a second hole aligned and a ring disposed over the female and male end connectors.

With reference now to the drawings, and in particular FIGS. 1 through 6C thereof, an example of the instant oval exercise hoop employing the principles and concepts of the present oval exercise hoop and generally designated by the reference number 10 will be described.

Referring to FIGS. 1 through 6C, the present oval exercise hoop 10 is illustrated. The oval exercise hoop 10 includes an oval tubular sleeve 20 having a first section 21 and a second section 22 attachable to each other. The oval shape of the sleeve 20 accommodates use by a wide range user body sizes. The sleeve 20 has a pair of diametrically disposed apices 24. A hollow core 26 is continuously disposed within each section 21, 22 of the sleeve 20.

Each of the first and second sections 21, 22 has an open female end 30 and a male end connector 32 on an opposite end. The male end connector 32 of the first section 21 and the male end connector 32 of the second section 22 engage the female end 30 of the second section 22 and the first section 21, respectively, at an offset position relative the respective apex 24. The location of the male end connectors 32 is off the y-axis 25. The male end connectors 32 are disposed approximately 70 degrees off a y-axis 25 of the sleeve 20 proximal the respective apex 24, rather than being disposed directly on the y-axis 25 or on the x-axis 23 in order to permit the user to grip only one of the minimum distance and the maximum distance along the sleeve 20. If the male end connector 32 were directly on either the x-axis 23 or the y-axis 25, the user would be required to grip a ring 50 surrounding the male end connectors 32 in order to be able to achieve a minimum stretch distance and alternately a maximum stretch distance along the sleeve 20.

A cushioned outer layer 53 is continuously disposed on each of the first and second sections 21, 22 to provide a nonslip grip of the sleeve 20. The cushioned outer layer 53 is formed of a foam cushion, a rubber material, and alternately, a rubber coated foam cushion or other material that functions consistently with the purposes of the present device. The outer layer 53 of each section 21, 22 has an outside end 54.

Each male end connector 32 includes a cylindrical interconnect extension 34 having a connection end 36 and an outer end 38 opposite the connection end 36. The interconnect extension 34 protrudes from the respective first and second section 21, 22, while the connection end 36 is permanently conjoined to the respective first and second section 21, 22. The outer end 38 of the interconnect extensions 34 is either removably or permanently disposed within the respective female end 30 of one of the first and second sections 21, 22. Thus, both outer ends can be permanently attached, both outer ends can be removable, or one of the outer ends can be permanently attached with the other one of the outer ends being removable.

The removable interconnect extension 34 includes a first hole 40 centrally disposed through the interconnect extension 34 proximal the outer end 38. A second hole 42 is centrally disposed at the female end 30. The first hole 40 and the second hole 42 align upon disposition of the interconnect extension 34 within the female end 30. Also, the removable interconnect extension 34 outer end 38 includes a threaded insert 45 continuously disposed through the interconnect extension 34. A threaded fastener 47 engages the threaded insert 45 to secure the male end connector 32 to the female end 30.

Figure 1A:
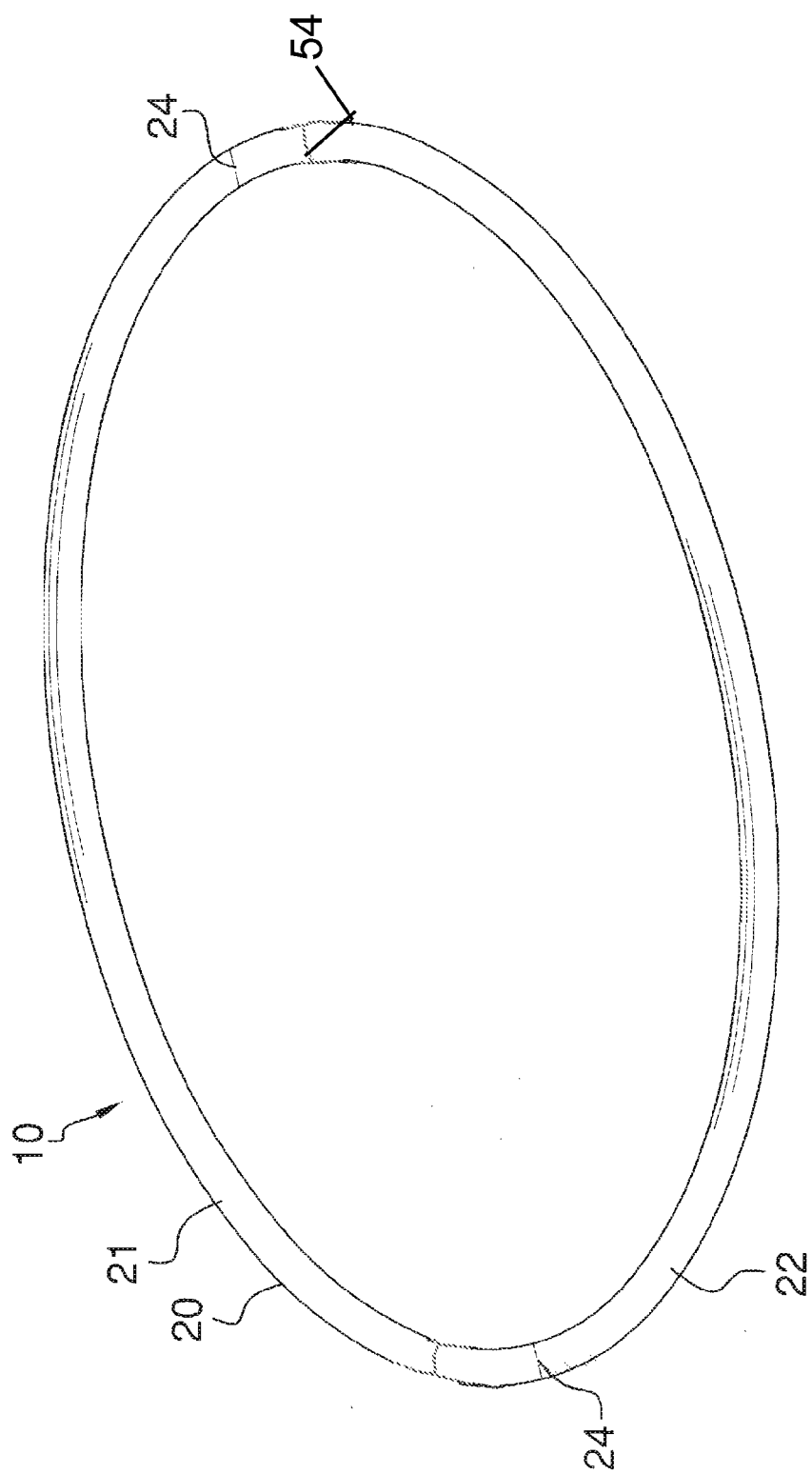
FIG. 1A is an isometric view showing both of the female and male end connectors permanently attached together without the first and second holes and the ring.
Figure 1B:
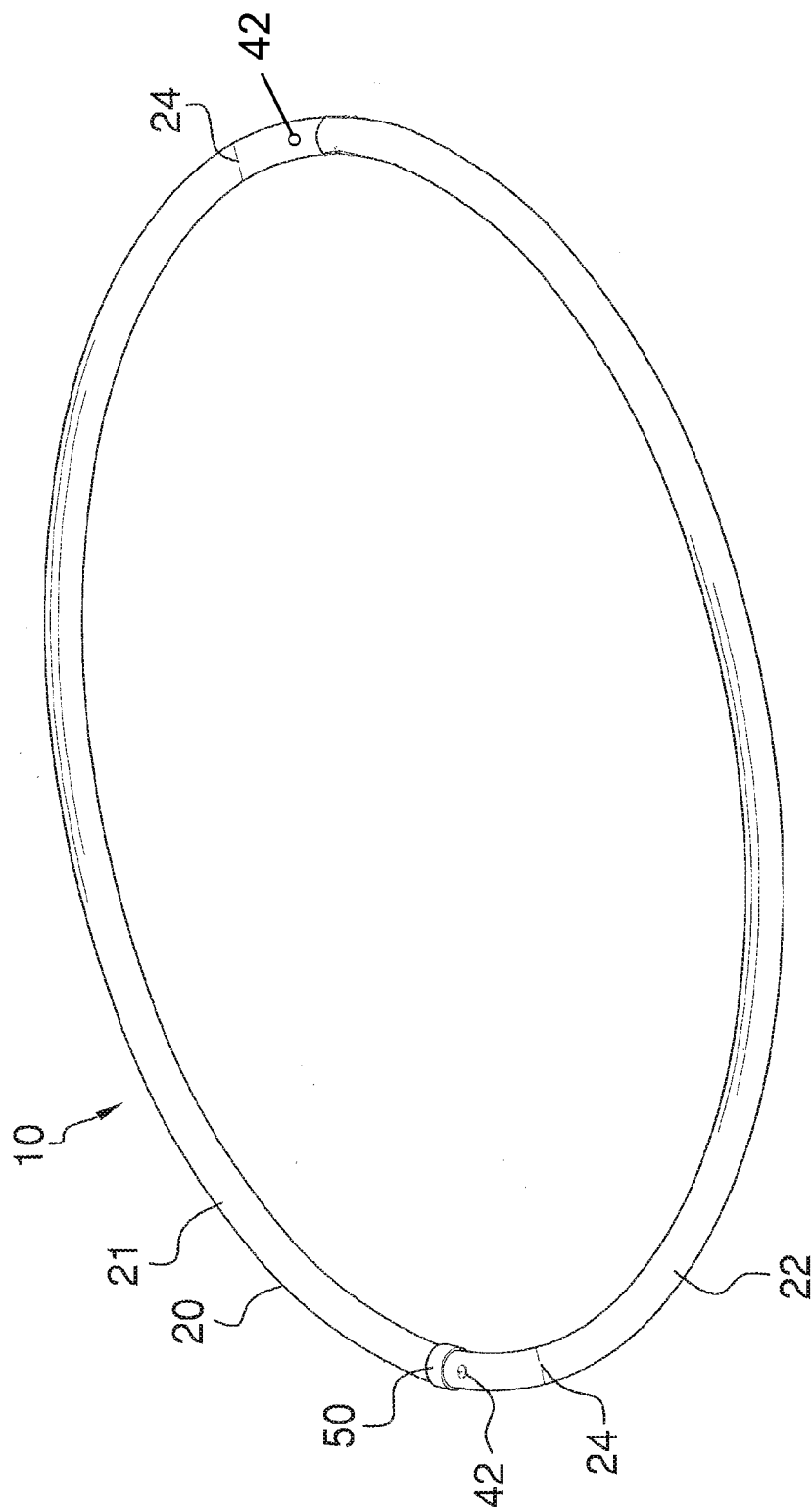
FIG. 1B is an isometric view showing one of the female and male end connectors conjoined without the ring, but with a threaded insert and an opposite one of the female and male end connectors separably attached together with the first and second holes aligned and a ring disposed over the female and male end connectors.
Figure 3:
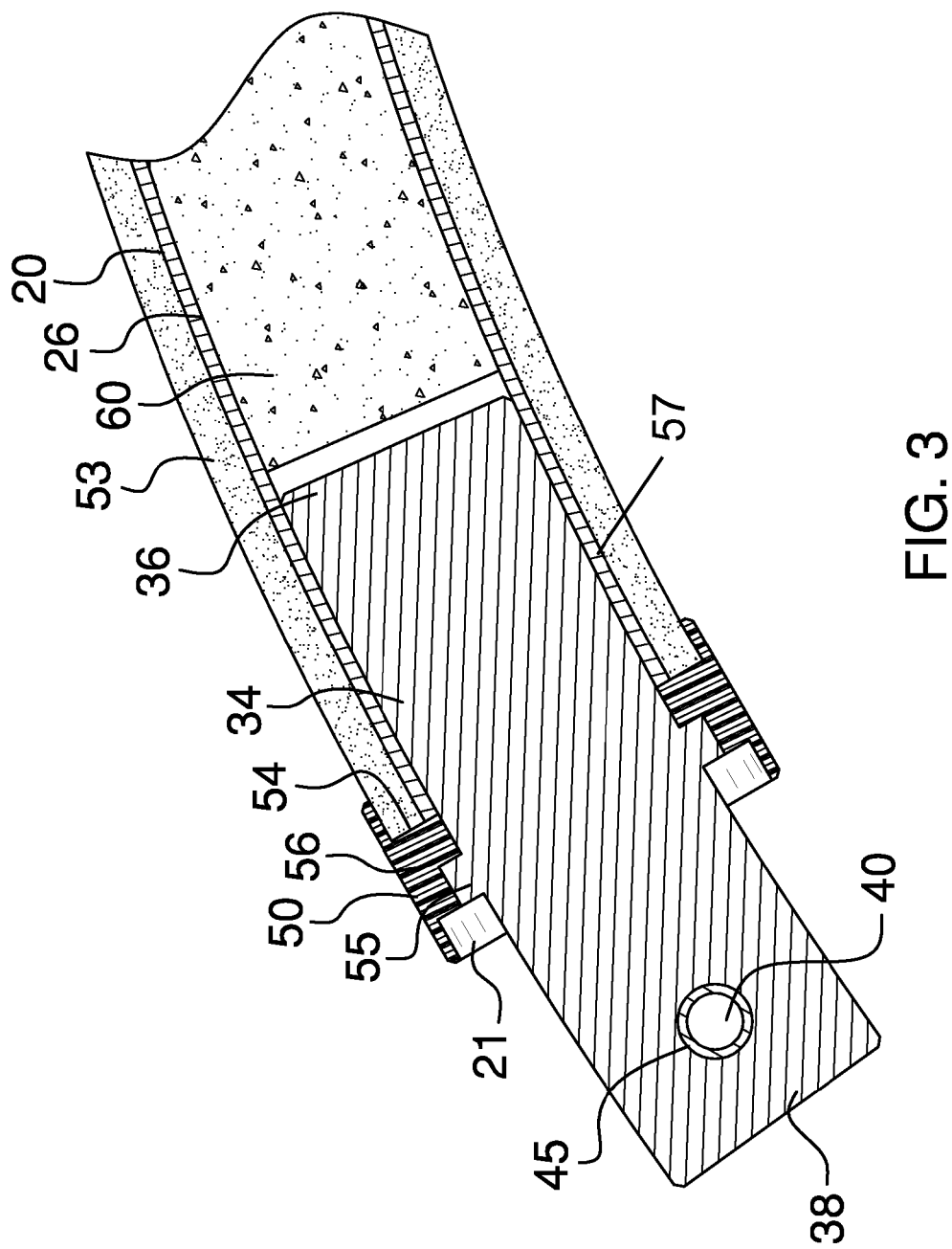
FIG. 3 is a cross-section view taken along line 3-3 of FIG. 2.
Figure 3A:
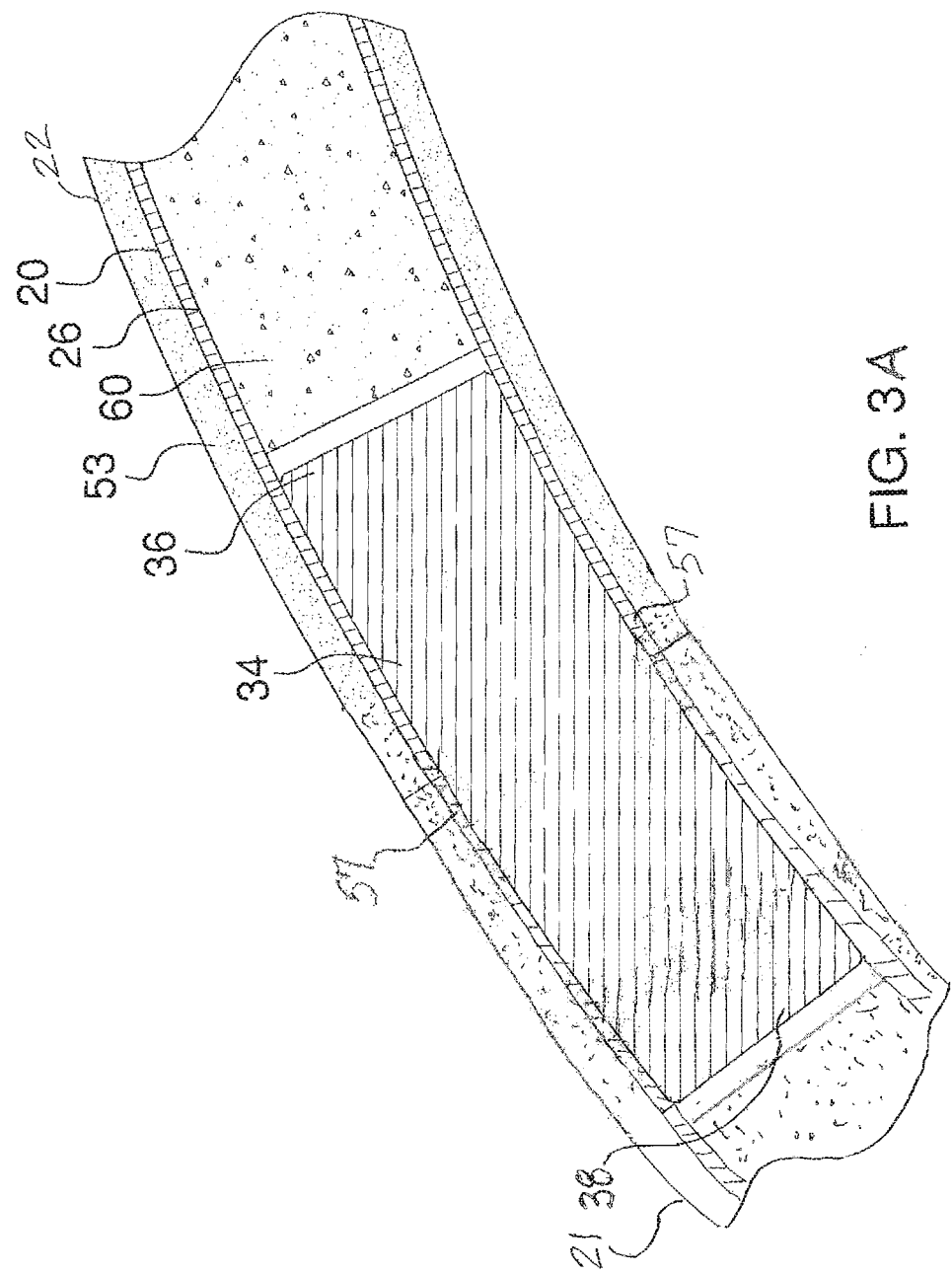
FIG. 3A is a cross-section view taken along line 3A-3A of FIG. 2A.
Figure 4:
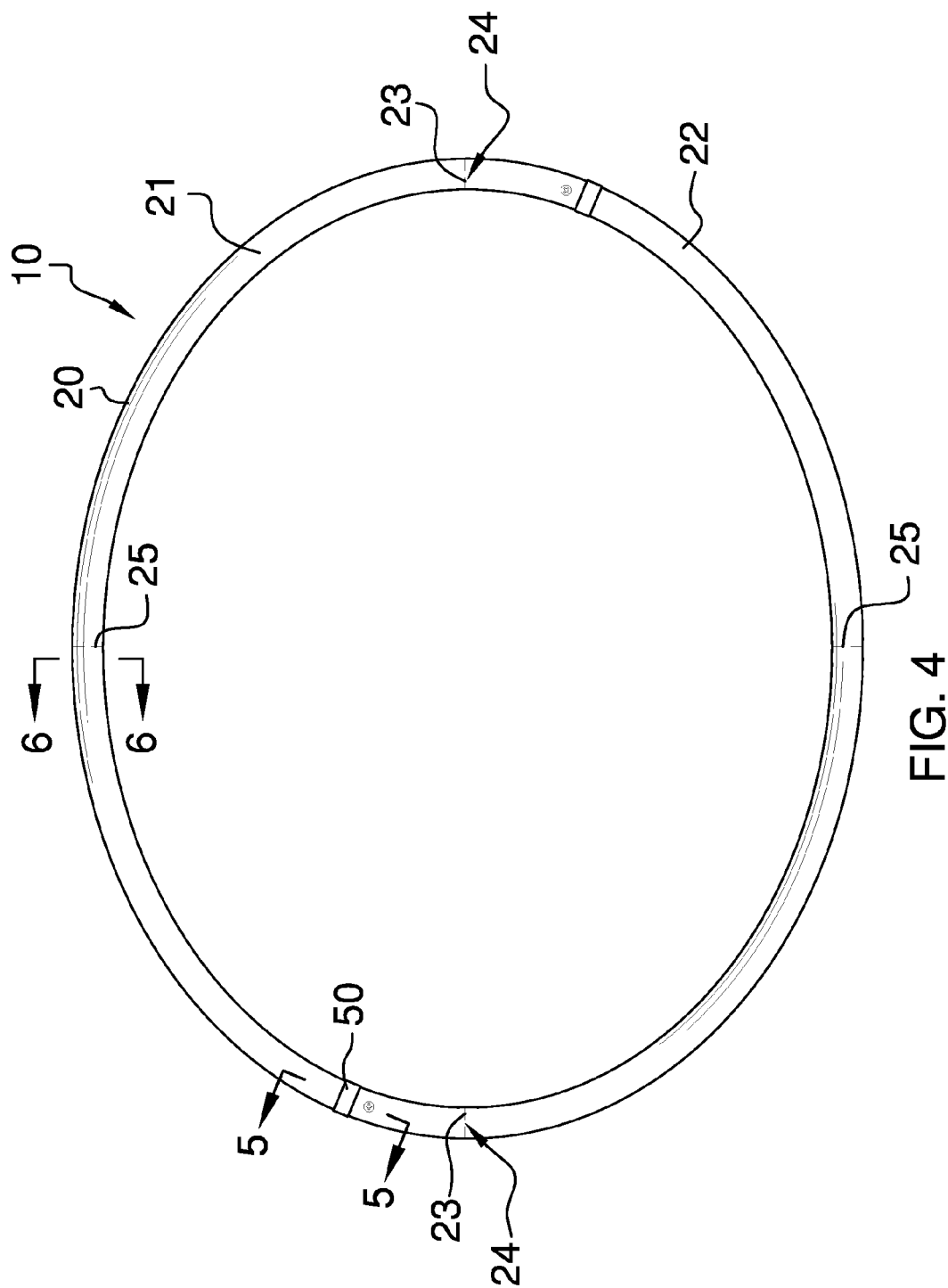
FIG. 4 is a top plan view.
Figure 5:
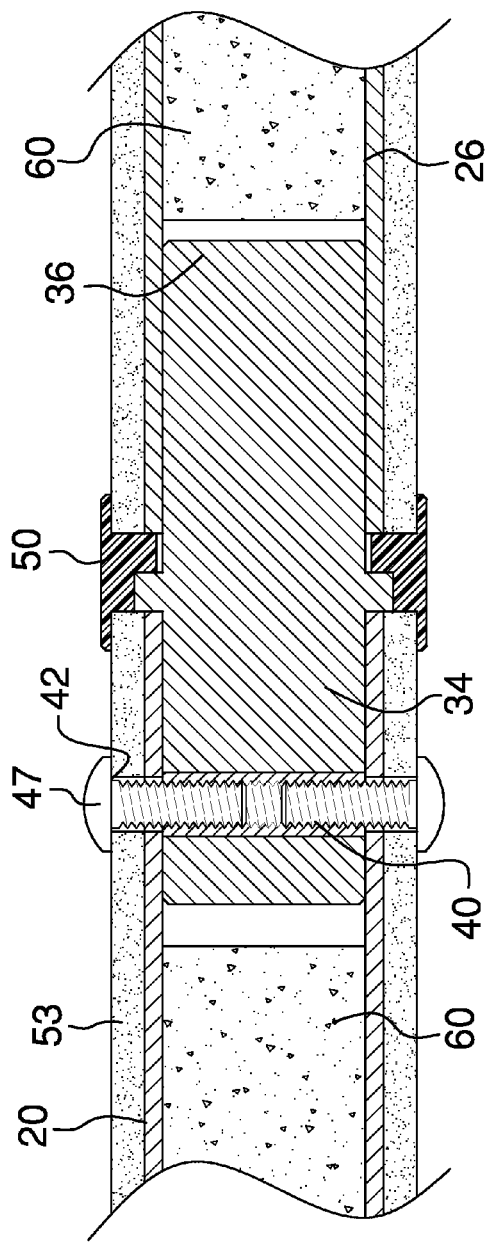
FIG. 5 is a cross-section view taken along line 5-5 of FIG. 4.

The removable interconnect extension 34 further optionally includes a ring 50 which is permanently secured around the outside ends 54 of each outer layer 53 of the respective sections 21, 22 upon disposition of the interconnect extension 34 within the female end 30 of each of the respective first and second sections 21, 22. A protrusion 55 centrally disposed on the interconnect extension 34 engages a notch 56 internally disposed in the ring 50. However, when both of the outer ends 38 of the interconnect extension 34 of the first and second sections 21, 22 and the outside ends 54 of each of the first and second section 21, 22 are permanently attached together, such as by an adhesive 57, as shown in FIGS. 1A and 2A, the first and second holes 40, 42, the threaded inserts 45 and the threaded fasteners 47 are not present, while the rings 50 are optionally provided.

The core 26 of each section 21, 22 is either empty or contains a weighted fill 60 continuously disposed within and encapsulated within the core 26 of the sections 21, 22. The weighted fill 60 has a density that has a direct positive correlation to an amount of energy required to rotate the sleeve 20 around the user's waist and torso while exercising. The weight of the sleeve 20 increases as the density of the weighted fill 60 increases. The weight of the sleeve can be from a lightest weight of 2.5 pounds to a heaviest weight of 75 pounds.

Figure 6C:
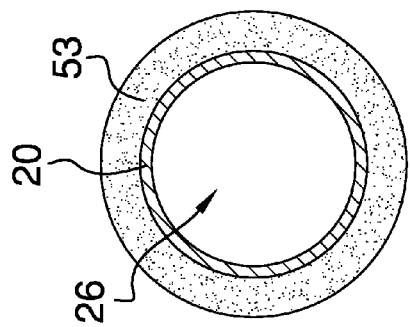
FIG. 6C is a cross-section view taken along line 6-6 of FIG. 4 showing no fill disposed within the core.
Figure 6B:
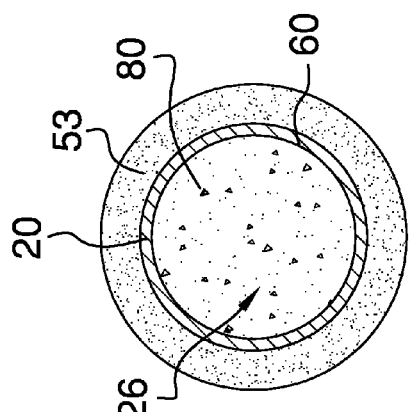
FIG. 6B is a cross-sectional view taken along line 6-6 of FIG. 4 showing a low density fill disposed within the core.
Figure 6A:
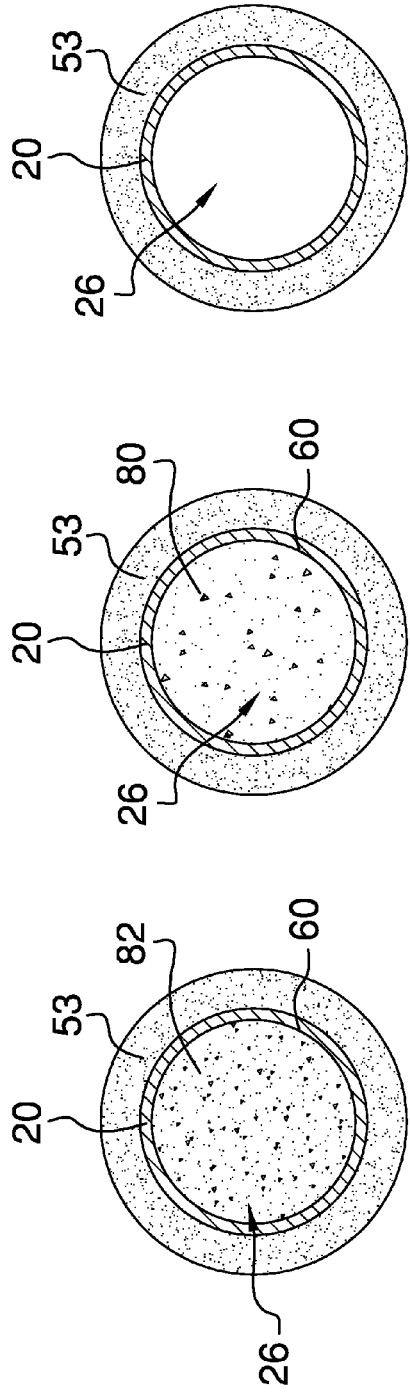
FIG. 6A is a cross-sectional view taken along line 6-6 of FIG. 4 showing a high density fill disposed within a core of a length of tubing.

The weighted fill 60 is in a range of densities from loose material 80 as shown in FIG. 6B to compact material 82 as shown in FIG. 6A and in a wide range of aggregate weights, ranging from light to heavy with a weight from 2.5 pounds to 75 pounds. Alternately, the core of the sections 21, 22 is empty as shown in FIG. 6C.

The user holds the sleeve 20 away from the body while rotating the sleeve 20 from side to side around the waist and torso to strengthen muscles in the user's arms and torso, while also expending energy. As the velocity of the side-toside rotation of the sleeve 20 is increased, the energy expended by the user also increases.

What is claimed is:

1. An oval exercise hoop comprising:
an oval tubular sleeve having a first section and a second section attachable to each other,
a pair of diametrically disposed apices of the sleeve; and
a hollow core continuously disposed within each of the first section and the second section of the sleeve;
wherein the attachment of the sections is at a position approximately 70 degrees off a y-axis of the sleeve proximal the respective apex.

2. The oval exercise hoop of claim 1 further comprising:
an open female end; and
a male end connector disposed on opposite the female end on each of the first and second sections, the male end connector of the first section and the male end connector of the second section engaging the female end of the second section and the first section, respectively, at an offset position relative the respective apex.

3. The oval exercise hoop of claim 2 further comprising a weighted fill disposed in the core of each section, the weighted fill continuously disposed within the core of each of the first and second sections;
wherein the weighted fill has a selected density;
wherein the weight of the sleeve increases as the density of the weighted fill increases; and
wherein the selected density has a direct positive correlation to an amount of energy required to rotate the sleeve.

4. The oval exercise hoop of claim 3 further comprising a cushioned outer layer continuously disposed on each of the first and second sections.

5. The oval exercise hoop of claim 4 further comprising a cylindrical interconnect extension of the male end connector, the interconnect extension having a connection end, an outer end opposite the connection end, and a protrusion centrally disposed thereon, the outer end of each of the interconnect extensions disposed within the female end of each of the first and second sections.

6. The oval exercise hoop of claim 5 wherein the outer end of each of the interconnect extensions is permanently disposed within the female end of each of the first and second sections.

7. The oval exercise hoop of claim 5 wherein the outer end of each of the interconnect extensions is removably disposed within the female end of each of the first and second sections.

8. The oval exercise hoop of claim 5 wherein the outer end of one of the interconnect extension is removably disposed within the female end of the respective one of first and second sections and the opposite interconnect extension is permanently disposed within the female end of the respective one of the first and second sections.

9. The oval exercise hoop of claim 7 further comprising:
a first hole centrally disposed through the interconnect extension proximal the outer end;
a second hole centrally disposed proximal the female end;
wherein the first hole and the second hole are alignable upon disposition of the interconnect extension within the female end;
a threaded insert disposed within the interconnect extension in alignment with the first and second holes; and
a fastener disposed within the threaded insert, wherein the fastener is configured to secure the male end connector and the female end together.

10. The oval exercise hoop of claim 8 wherein the removably disposed one of the interconnect extensions comprises:
a first hole centrally disposed through the interconnect extension proximal the outer end;
a second hole centrally disposed proximal the female end;
wherein the first hole and the second hole are alignable upon disposition of the interconnect extension within the female end;
a threaded insert disposed within the interconnect extension in alignment with the first and second holes; and
a fastener disposed within the threaded insert, wherein the fastener is configured to secure the male end connector and the female end together.

11. The oval exercise hoop of claim 9 further comprising:
wherein the first hole is further disposed through the outer layer; and
a pair of outside ends of the outer layer of each section;
a ring having a notch internally disposed therein, the ring disposed around the outside ends of the outer layer of each of the first and second sections upon the engagement of the interconnect extension to the respective female end, wherein the interconnect extension protrusion securingly engages the ring notch.

12. The oval exercise hoop of claim 10 further comprising:
wherein the first hole is further disposed through the outer layer; and
a pair of outside ends of the outer layer of each section;
a ring having a notch internally disposed therein, the ring disposed around the outside ends of the outer layer of each of the first and second sections upon the engagement of the interconnect extension to the respective female end, wherein the interconnect extension protrusion securingly engages the ring notch.

13. An oval exercise hoop comprising:
an oval tubular sleeve having a first section and a second section attachable to each other,
a pair of diametrically disposed apices of the sleeve;
a hollow core continuously disposed within each of the first and second sections of the tubular sleeve;
an open female end and a male end connector disposed on opposite the female end on each of the first and second sections, the male end connector of the first section and the male end connector of the second section engaging the female end of the second section and the first section, respectively, at an offset position relative the respective apex;
wherein the male end connectors are disposed approximately 70 degrees off a y-axis of the sleeve proximal the respective apex;
a cylindrical interconnect extension of the male end connector, the interconnect extension having a connection end, an outer end opposite the connection end, and a protrusion disposed thereon, wherein the outer end of each interconnect extension is disposed within the respective female end of the respective first and second sections;
a cushioned outer layer continuously disposed on each of first and second sections;
a weighted fill disposed in the core of each of the first and second sections, the weighted fill continuously disposed within the core of each first and second section;
wherein the weighted fill has a selected density;
wherein the weight of the sleeve increases as the density of the weighted fill increases;

wherein the selected density has a direct positive correlation to an amount of energy required to rotate the sleeve;
wherein only upon a removable disposition of the outer end of at least one of the interconnect extensions, the interconnect extension further includes:
  a first hole centrally disposed through the interconnect extension proximal the outer end;
  a second hole centrally disposed proximal the female end;
  wherein the first hole and the second hole are alignable upon disposition of the interconnect extension within the female end;
  a threaded insert disposed within the interconnect extension in alignment with the first and second holes;
a fastener disposed within the threaded insert, wherein the fastener is configured to secure the male end connector and the female end together;

a pair of outside ends of the outer layer of each of the first and second sections; and
a ring having a notch internally disposed therein, the ring disposed around the outside ends of the outer layer of each section upon the engagement of the interconnect extension to the respective female end, wherein the interconnect extension protrusion securingly engages the ring notch.

14. The oval exercise hoop of claim 13 wherein the weighted fill is in a range of densities from loose material to compact material and in a wide range of aggregate weights ranging from light to heavy.

15. The oval exercise hoop of claim 14 wherein the lightest aggregate weight is 2.5 pounds and wherein the heaviest aggregate weight is 75 pounds.

* * * * *